UNITED STATES PATENT OFFICE.

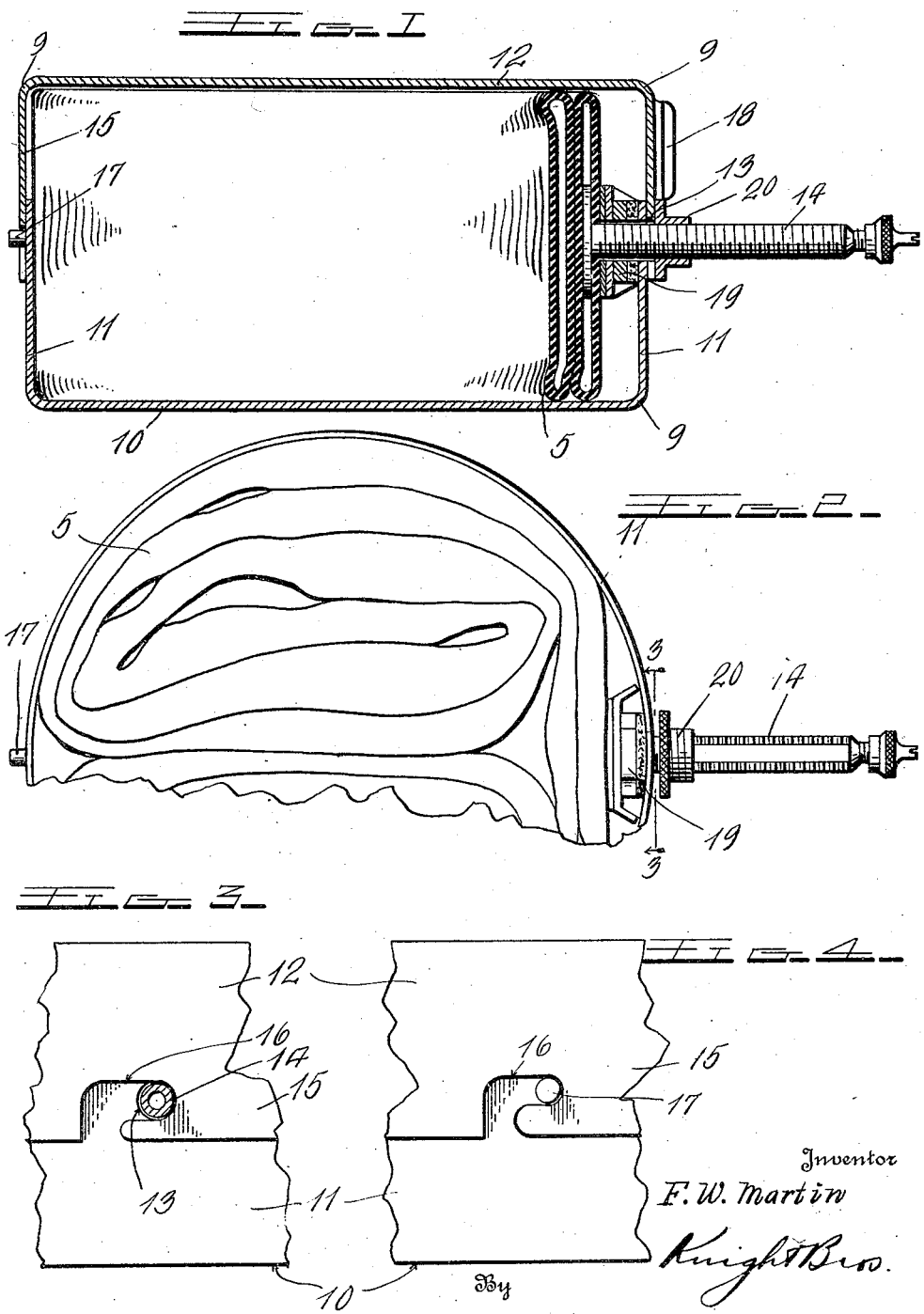

FREDERICK W. MARTIN, OF WICHITA, KANSAS.

RECEPTACLE.

1,418,954.  Specification of Letters Patent.  Patented June 6, 1922.

Application filed January 24, 1921. Serial No. 439,509.

*To all whom it may concern:*

Be it known that I, FREDERICK W. MARTIN, a citizen of the United States, residing at Wichita, in the county of Sedgwick and State of Kansas, have invented certain new and useful Improvements in Receptacles, of which the following is a specification.

My invention relates to receptacles and more particularly to a receptacle designed to receive inner tubes of automobile tires.

Heretofore extra or spare inner tubes have become damaged and rendered useless because the motion of the automobile, for instance, causes them to chafe and this chafing eventually wears holes in the tube.

Attempts have been made to eliminate this chafing of the inner tube by carefully packing the same, but in the several types of containers which are generally known and which are particularly adapted for the storing of inner tubes while the tube is protected to some extent, there is a chafing of the tube by the container itself which eventually proves as disastrous as though there were no container at all.

It is the primary object, therefore, of my invention to provide a receptacle of such proportions and shape to enable it to conveniently house a deflated inner tube. Furthermore, with a container constructed in accordance with my invention all possibility of chafing between the tube and the container is eliminated by inflating the tube after it has been placed therein, thereby causing the tube to completely fill the receptacle.

I preferably form my container out of metal and provide a cover to prevent any foreign matter which would injure the inner tube from entering the receptacle.

Another feature of my invention resides in the fact that the condition of the inner tube may be readily determined. Inasmuch as air under pressure is retained by the tube during the time it is housed in the receptacle, a defective tube will become deflated and this fact will be apparent when the tube is to be removed from the receptacle. If the tube is in condition for use and consequently is partly inflated, it will be necessary to deflate the tube before it can be removed from the receptacle.

The invention will be more particularly described and illustrated in the accompanying specification and drawings in which:

Fig. 1 is a transverse section of the receptacle containing a tube;

Fig. 2 is a fragmentary plan view of the receptacle with the cover removed.

Fig. 3 is a fragmentary sectional view on lines 3—3 of Fig. 2, and

Fig. 4 is an elevation of the cover attaching means.

The container comprises the receptacle 10 made preferably of metal and of cylindrical form and having a side wall 11. One side of the receptacle is open and provided with a cover 12. This cover is adapted to closely engage the wall 11 of the receptacle to provide a dirt-proof connection. The corners of the cover 12 and receptacle 10 are rounded as indicated at 9. The wall 11 of the receptacle is suitably apertured as indicated at 13 to enable the valve stem 14 of the inner tube 5 to project therethrough.

In order to secure the cover 12 on the receptacle against accidental displacement, I construct the same in the following manner: The side wall 15 of the cover is provided with L-shaped or bayonet slots 16 extending from the edge of the wall 15. There are two of these L-shaped slots arranged opposite one another on the wall of the cover. The wall 11 of the receptacle 10 is provided with a lug 17 preferably welded thereto and at a point diametrically opposite the opening 13. In assembling the cover and the receptacle, after the inner tube has been placed within the receptacle, with the valve stem 14 projecting therethrough, the bayonet shaped slots are positioned so as to register with the lug 17 and the valve stem 14. With the necessary downward and rotary movement of the cover 12, it is secured in position, by engagement with the lug 17 and the valve stem 14 respectively. To enable the cover to be conveniently rotated and in order that the position of one of the bayonet slots may be readily ascertained, I provide a rib 18 on the cover 12 at a point immediately adjacent one of the L-shaped slots.

In positioning a tube in the receptacle, it is deflated and folded to a shape such as illustrated in Fig. 2, which approximates the cylindrical shape of the receptacle. The valve stem 14 is projected through the aperture 13 until the usual washers 19 abut the wall of the receptacle. The valve stem has a clamping nut 20 of the usual construction. The cover 12 is then placed on the receptacle. By applying the cover with the rib 18 adjacent the aperture 13, the vertical legs of the L-shaped grooves will be caused to register with the lug 17 and the valve stem 14. A subsequent circumferential rotation of the cover will position the lug 17 and the valve stem 14 at the inner end of the L-shaped slots. Air is then pumped into the tube, causing the same because of its inflation, to expand and intimately engage the walls of the receptacle. With the tube thus inflated, all possibility of movement of the tube within the receptacle, which would cause it to wear or chafe, is eliminated. By tightening the valve stem nut 20, the edges of the walls 11 and 15 of the receptacle and cover respectively may be clamped between this nut and the washers 19 of the valve stem.

In order to remove the tube from the receptacle it is first necessary to deflate the same and to remove the valve stem nut 20 on the valve stem 14. Then by rotating the cover 12 to cause the vertical legs of the L-shaped slots to register with the lug 17 and the valve stem 14, the cover may be lifted from the receptacle. With the tube deflated the valve stem 14 may be withdrawn from the aperture 13. If, however, the tube is defective and air originally pumped into the tube has escaped, this fact will be immediately apparent, and the tube may be discarded without further thought.

Because of the rigidity of the receptacle, the tube when inflated is permitted to expand only a limited amount and considerable pressure may therefore be brought to bear against the walls of the receptacle to hold the inner tube firmly therein, with only a comparatively small amount of air in the tube.

It is obvious, that various modifications and changes in the specific structure illustrated may be resorted to without departing from the spirit and scope of my invention, and I particularly reserve this right.

Having thus described my invention, what I claim is:

1. A container for inner tubes comprising a cylindrical metal receptacle, a cover for closing said receptacle, the wall of said cover being formed with a slot, said receptacle being adapted to receive the inner tube in a deflated condition, the wall of said receptacle being apertured to permit the valve stem of the inner tube to project therethrough, whereby the tube may be inflated causing the same to expand against the walls of the receptacle, said valve stem being caused to enter said slot to secure said cover in place.

2. A container for inner tubes comprising a cylindrical metal receptacle open at one side thereof, a removable metal cover for closing the open side of said receptacle, the walls of said cover being formed with L-shaped slots, a projection formed on the wall of said receptacle adjacent its open side, the wall of said receptacle being provided with an aperture, at a point opposite said projection to permit the valve stem of an inner tube to be projected therethrough, said projection, valve stem and L-shaped slots cooperating to removably secure said cover to the receptacle.

3. A container for inner tubes comprising a cylindrical metal receptacle open at one side thereof, a removable metal cover for closing the open side of said receptacle, a lug formed on the wall of said receptacle adjacent its open side, the wall of said receptacle being provided with an aperture at a point diametrically opposite said lug, to permit the valve stem of the inner tube to be projected therethrough, the edge of the wall of said cover being provided with L-shaped slots, a rib formed on said cover at a point immediately above one of said L-shaped slots, said lug, valve stem and L-shaped slots cooperating to removably secure said cover to said receptacle, substantially as described.

4. A container for inner tubes comprising a receptacle, a removable cover for closing said receptacle, the wall of said cover having formed therein L-shaped slots, the wall of said container being apertured to permit the valve steam of the inner tube to project therethrough, said valve stem and slot cooperating to removably secure said cover in place.

FREDERICK W. MARTIN.